(12) United States Patent
Matsuoka et al.

(10) Patent No.: US 12,703,039 B2
(45) Date of Patent: Aug. 11, 2026

(54) SPOT WELDING METHOD

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Hideaki Matsuoka, Nagakute (JP); Gaku Kitahara, Nagakute (JP); Tatsuyuki Amago, Nagakute (JP); Hiroyuki Mori, Nagakute (JP); Jun Yaokawa, Nagakute (JP); Kyosuke Izuno, Nisshin (JP); Shuhei Ogura, Nagakute (JP); Tomohiko Sekiguchi, Nagakute (JP); Ayaka Kagami, Inazawa (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 780 days.

(21) Appl. No.: 18/166,225

(22) Filed: Feb. 8, 2023

(65) Prior Publication Data

US 2023/0311233 A1 Oct. 5, 2023

(30) Foreign Application Priority Data

Mar. 30, 2022 (JP) ................................ 2022-057680

(51) Int. Cl.
*B23K 11/11* (2006.01)
*B23K 11/24* (2006.01)
*B23K 11/30* (2006.01)

(52) U.S. Cl.
CPC ............ *B23K 11/115* (2013.01); *B23K 11/24* (2013.01); *B23K 11/3009* (2013.01)

(58) Field of Classification Search
CPC ... B23K 11/115; B23K 11/24; B23K 11/3009; B23K 11/10; B23K 11/3018; B23K 11/314
See application file for complete search history.

(56) References Cited

U.S. PATENT DOCUMENTS 7,943,883 B2 5/2011 Doira et al.
10,173,281 B2 1/2019 Sakurai et al.
(Continued)

FOREIGN PATENT DOCUMENTS

EP 3575028 A1 4/2019
JP 2006-289452 A 10/2006
(Continued)

OTHER PUBLICATIONS

Mar. 5, 2024 Office Action issued in Japanese Patent Application No. 2022-057680.

*Primary Examiner* — Justin C Dodson
*Assistant Examiner* — Krystene Nhelle B Maceda
(74) *Attorney, Agent, or Firm* — Oliff PLC

(57) ABSTRACT

A spot welding method including: a main energization step of energizing a pair of opposing electrodes in pressure contact with both outer surfaces of a set of sheets where multiple sheet materials are stacked, thereby to cause melting between facing surfaces of the sheet materials; and a pressing variation step of, prior to the main energization step, causing a pulsation of pressing force applied to the set of sheets from the electrodes. A resin material such as an adhesive or a sealant may be interposed between the facing surfaces of at least a pair of the sheet materials. The period of the pulsation is 0.01 to 0.7 seconds. The amplitude of the pulsation is 10% to 90% with respect to a reference value of (Continued)

the pressing force. The set of sheets may include a first and a second steel sheet, and an aluminum alloy sheet that are stacked in order.

10 Claims, 5 Drawing Sheets

(56) References Cited

U.S. PATENT DOCUMENTS

| | | | | |
|---|---|---|---|---|
| 2008/0102308 | A1 | 5/2008 | Doira et al. | |
| 2011/0097594 | A1* | 4/2011 | Tanaka | B23K 11/166 219/86.22 |
| 2011/0123825 | A1 | 5/2011 | Sakurai et al. | |
| 2014/0144889 | A1 | 5/2014 | Sakurai et al. | |
| 2018/0043459 | A1* | 2/2018 | Sawanishi | B23K 11/16 |
| 2018/0043461 | A1* | 2/2018 | Taniguchi | B23K 11/253 |
| 2019/0240768 | A1* | 8/2019 | Furusako | B23K 11/11 |

FOREIGN PATENT DOCUMENTS

| | | | | |
|---|---|---|---|---|
| JP | 2008-105087 | A | 5/2008 | |
| JP | 2009-190051 | A | 8/2009 | |
| JP | 2013-27890 | A | 2/2013 | |
| JP | 2013-78804 | A | 5/2013 | |
| JP | 2018-122314 | A | 8/2018 | |
| WO | WO-2018181232 | A1 * | 10/2018 | B23K 11/11 |

* cited by examiner

Sample 1 (with pressing variation)

Delaminated surface (Al alloy side)

Delaminated surface (steel sheet side)

Sample C1 (without pressing variation)

Delaminated surface (Al alloy side)

Delaminated surface (steel sheet side)

SPOT WELDING METHOD

TECHNICAL FIELD

The present invention relates to a spot welding method and relevant techniques.

BACKGROUND ART

Vehicle bodies, airframes, and other similar articles are manufactured by spot welding to join a plurality of sheet materials (materials to be joined) at multiple points. Spot welding is one type of resistance welding using Joule heating, which is performed by energizing stacked sheet materials with a large current for a short time from electrodes that are in pressure contact with the outer surfaces of the stacked sheet materials. In general, the energization forms a molten pool in the vicinity of a contact interface (portions to be joined) between the stacked sheet materials, and the molten pool is cooled and solidified into a welded portion (nugget). Thus, the plurality of sheet materials is joined together at multiple points by spot-shaped nuggets to form a structure (weldment). Spot welding is performed not only between sheet materials of the same type (e.g., between steel sheets) but also between sheet materials of different types (e.g., between an aluminum alloy sheet and a steel sheet). Proposals for such spot welding are found, for example, in the following patent documents.

PRIOR ART DOCUMENTS

Patent Documents

[Patent Document 1] JP2006-289452A
[Patent Document 2] JP2008-105087A
[Patent Document 3] JP2013-78804A
[Patent Document 4] JP2013-27890A

SUMMARY OF INVENTION

Technical Problem

In each of Patent Documents 1 to 3, spot welding is performed while the pressing force applied to the sheet materials from the electrodes is kept constant.

In Patent Document 4, a prepressing step, a preheating step, a cooling step, and a welding step are performed in this order to spot-weld a set of sheets in which three sheet materials comprising a non-plated steel sheet, a galvanized steel sheet, and an aluminum alloy sheet are stacked in order ([0036] to [0054], Table 1, FIG. 6, etc.). In this spot welding, the pressing force is set to 2 kN in the prepressing step and the preheating step and is increased to 5 kN for the cooling step and the welding step. However, even though the pressing force is changed between different steps, it does not vary and is constant during one step. Accordingly, none of the patent documents describes increasing or decreasing the pressing force during one step.

The present invention has been made in view of such circumstances, and an object of the present invention is to provide a novel method and relevant techniques with which spot welding can be performed stably and efficiently.

Solution to Problem

As a result of intensive studies to achieve the above object, the present inventors have conceived of increasing and decreasing (pulsating) the pressing force applied to the sheet materials from the electrodes prior to main energization and have newly found that a spot weldment can be stably obtained with desired characteristics. Developing this achievement, the present inventors have accomplished the present invention, which will be described hereinafter.

«Spot Welding Method»

The present invention provides a spot welding method comprising: a main energization step of energizing a pair of opposing electrodes in pressure contact with both outer surfaces of a set of sheets in which two or more sheet materials are stacked, thereby to cause melting between facing surfaces of the sheet materials; and a pressing variation step of, prior to the main energization step, causing a pulsation of pressing force applied to the set of sheets from the electrodes.

According to the present invention, it is possible to stably or efficiently obtain a spot weldment (also simply referred to a "weldment") in which desired characteristics (such as the joint strength) are ensured. The reason for this is currently considered as follows.

In the spot welding method (also simply referred to as a "welding method") of the present invention, the main energization step is performed with a large amount of energization between the sheet materials after the contact state has been improved by the pressing variation step. This allows the main energization step to be performed stably while suppressing the occurrence of spatter (explosion) and dust, etc. due to sparks and rapid resistance heating, and a weldment can be efficiently obtained with desired characteristics (such as the joint strength).

«Spot Weldment and Control Device or Control Program for Spot Welding»

The present invention is also perceived as a spot weldment obtained by the above-described method. Additionally or alternatively, the present invention is also perceived as a control device or its control program for spot welding that controls the above-described pressing force and/or energization to the electrodes.

In the features of the control device or the control program, for example, the features of "-steps" according to the above-described method are read and perceived as "-means" or "-units." Additionally or alternatively, the present invention may be perceived as a control method of executing the control program on a computer by reading "-steps" as "-program steps."

«Others»

(1) In the present specification, a joined portion containing an intermetallic compound that can be generated by a melting reaction is also referred to as a nugget, and the case of joining via the nugget is also referred to as "spot welding" or simply referred to as "welding." For descriptive purposes, two or more sheet materials, steps, etc. are distinguished by adding "first," "second," etc. as appropriate.

(2) Unless otherwise stated, a numerical range "x to y" as referred to in the present specification includes the lower limit x and the upper limit y. Any numerical value included in various numerical values or numerical ranges described in the present specification may be selected or extracted as a new lower or upper limit, and any numerical range such as "a to b" can thereby be newly provided using such a new lower or upper limit. Unless otherwise stated, a range "x to y kN" as referred to in the present specification means x kN to y kN. The same applies to other unit systems (such as kA and $A/mm^2$).

EMBODIMENTS FOR CARRYING OUT THE INVENTION

Figure 1:
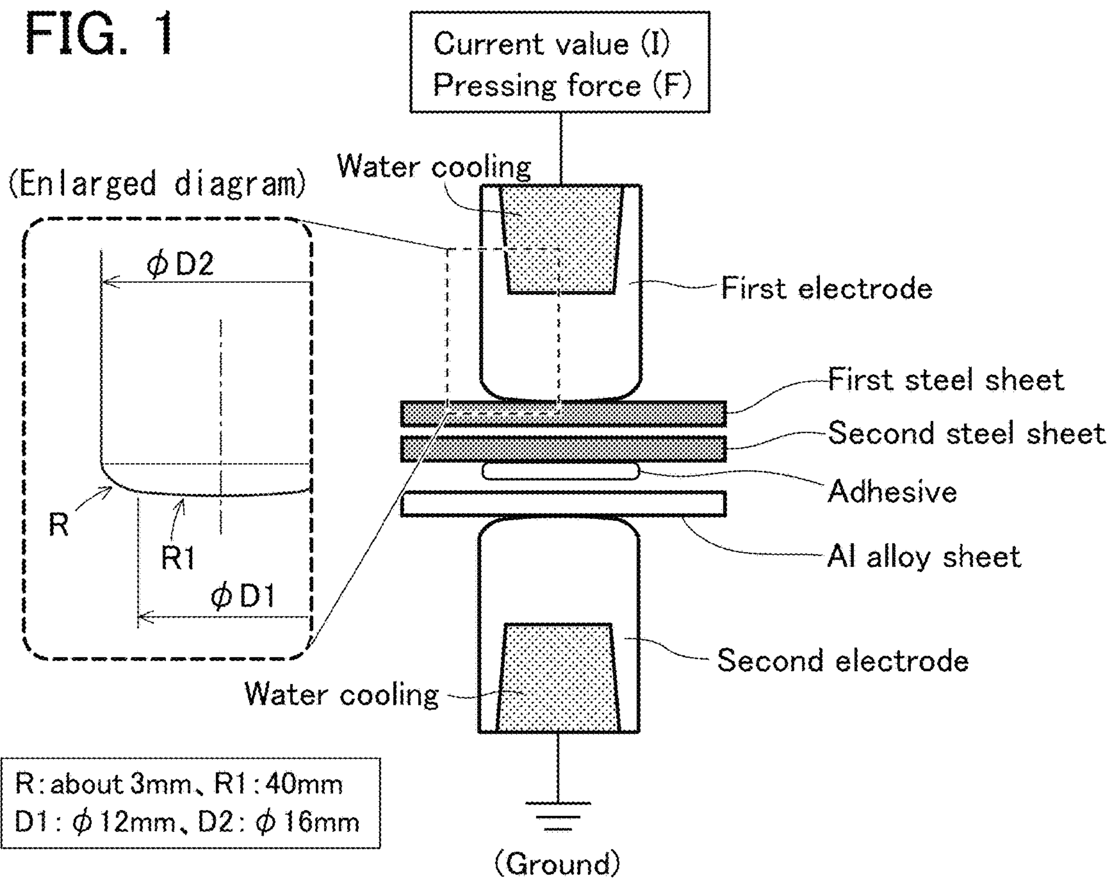
FIG. 1 is a schematic diagram illustrating the overview of spot welding.

One or more features freely selected from the present specification can be added to the above-described features of the present invention. The content described in the present specification can be applied not only to the welding method or a weldment but also to a control device, a control program, etc. as appropriate. Which embodiment is the best or not is different in accordance with objectives, required performance, and other factors.

«Sheet Materials/Set of Sheets»

Spot welding (also simply referred to as "welding") is performed on a set of sheets in which at least two sheet materials are stacked. The sheet materials may be those of the same type or different types. The set of sheets may include, for example, two or more steel sheets, two or more aluminum alloy sheets (simply referred to as "Al alloy sheets"), or a combination of one or more steel sheets and one or more Al alloy sheets. Thus, the set of sheets may include three or more sheet materials (e.g., a first steel sheet, a second steel sheet, and an Al alloy sheet). In the case of sheet materials of the same type, they may be different in the alloy composition, surface treatment state (such as the presence or absence of plating), sheet thickness, etc. The present invention can also be appropriately applied to spot welding of members other than sheet materials.

The steel sheets are, for example, cold-rolled steel sheets, hot-rolled steel sheets, high-strength steel sheets, hot-stamped steel sheets, or other similar steel sheets. The steel sheets may be surface-treated. Galvanization is the typical surface treatment for steel sheets. The galvanized steel sheets are, for example, hot-dip galvanized steel sheets, electro galvanized steel sheets, alloyed hot-dip galvanized steel sheets, or other similar galvanized steel sheets. The alloyed hot-dip galvanized steel sheets may be aluminum-zinc alloy-plated steel sheets (so-called Galvalume steel sheets (registered trademark)). Metal layers (such as galvanized layers) are usually on both surfaces of a steel sheet, but a single metal layer may be provided only on one surface of a steel sheet.

A steel sheet (e.g., the second steel sheet) to be joined to an Al alloy sheet may preferably have a metal layer having a melting point lower than that of the Al alloy sheet (simply referred to as a "low melting point metal layer") at least on the Al alloy sheet side. The low melting point metal layer melts prior to (in priority to) a base material (Al alloy) of the Al alloy sheet and spreads wet between the surfaces to be joined of the Al alloy sheet and the steel sheet. This allows the Al alloy sheet and the steel sheet to be firmly joined over a wide range via a nugget containing an intermetallic compound.

For the Al alloy sheet, 2000 series to 8000 series, in particular 5000 series or 6000 series, are usually used. In the case of the 5000 series, for example, Al alloy sheets corresponding to A5052, A5083, A5005, etc. defined by JIS are used. In the case of the 6000 series, for example, Al alloy sheets corresponding to A6022, A6016, A6N01, etc. defined by JIS are used. Al alloy sheets as referred to in the present specification include A1000 series.

The sheet thickness of each sheet material may be the same or different. The sheet thickness of the steel sheets is, for example, 0.4 to 2.5 mm in an embodiment or 0.6 to 1.8 mm in another embodiment. The sheet thickness of the Al alloy sheet is, for example, 0.8 to 3 mm in an embodiment or 1 to 2 mm in another embodiment.

«Pressing Variation Step»

In general, the pressing force applied to the set of sheets from the electrodes (tip portions) is set constant throughout a step of spot welding (from the start to the end). The pressing force may be different between steps, but the pressing force is kept constant during at least one step.

On the other hand, in the pressing variation step of the present invention, the pressing force applied to the set of sheets from the electrodes is pulsated. Pulsation means that the pressing force increases and decreases within one step. The increase and decrease referred to herein mean, for example, that the pressing force temporarily increases and then decreases or decreases and then increases. Usually, the pressing force that has increased or decreased from a value that is set as a reference (simply referred to as a "reference value") returns to the vicinity of the reference value. In the present specification, one increase or decrease is referred to as one variation, the time required for one variation is referred to as a period, the amount of change (variation width) in the pressing force for one variation is referred to as an amplitude (difference from the maximum peak to the minimum peak), and the relationship between the pressing force and the time in one variation is referred to as one waveform.

The pressing force may vary a plurality of times. For each variation, the period, amplitude, and waveform may be the same or different. The period is, for example, 0.01 to 0.7 seconds in an embodiment, 0.05 to 0.5 seconds in another embodiment, or 0.1 to 0.3 seconds in still another embodiment. The amplitude is, for example, 10% to 90% with respect to the reference value of the pressing force in an embodiment, 30% to 70% in another embodiment, or 40% to 60% in still another embodiment. The pressing force may be preferably within a range in which stable contact between the sheet materials is maintained. Excessive decrease in the pressing force may cause displacement of the contact positions between the electrodes and the sheet materials and the planned welding sites.

The reference value of the pressing force may be an average value (base set value) of the pressing force in its stable region in the pressing variation step. If the average value is difficult to specify, the pressing force (set value) used as a base in a step (e.g., the main energization step) subsequent to the pressing variation step may be used as the reference value.

The waveform of the pulsating pressing force may be, for example, any of a rectangular shape (pulse-like shape), a triangular-wave shape, and a curved shape (such as a sine curve). The waveform may be double swing (both increasing and decreasing change) or single swing (either increasing or decreasing change) with respect to the reference value.

It is sufficient for the pressing variation step to improve, prior to the main energization, the contact state between the sheet materials to be welded. The time required for the pressing variation step is, for example, 0.1 to 1 second in an embodiment or 0.3 to 0.7 seconds in another embodiment.

The pressing variation step is performed prior to the main energization step in which the amount of energization is large. The pressing variation step may be preferably performed, for example, at an initial stage (within 1 second in an embodiment or within 0.5 seconds in another embodiment) immediately after the electrodes come into contact with the sheet materials. When multi-stage main energization is performed, the pressing variation step may be preferably performed at least before preceding main energization (e.g., a first energization step). The pressing variation step may also be performed before subsequent main energization (e.g., a second energization step). The pressing variation step may also be performed a plurality of times (e.g., each time before the main energization).

When the pressing variation step is performed a plurality of times, the conditions for each pressing variation step (such as the pressing force and the presence or absence of energization) may be the same or different. The pressing force (reference value) during the pressing variation step may be the same as or different from the pressing force (reference value) during the main energization. Energization may be performed during the pressing variation step. The energization may be preferably performed to such an extent that melting or compound formation does not occur between the sheet materials (such as pilot energization or pre-energization that does not come up to the main energization).

«Main Energization Step»

In the main energization step, energization is performed to cause melting between the facing surfaces of at least two sheet materials. The main energization step may be performed in multiple stages. The energization conditions (e.g., current value, pressing force, energization time, etc.) during the main energization step are adjusted as appropriate depending on the welding situation (the presence or absence of spatter or dust, etc.) and the like, such as the type and form of the sheet materials (thickness, etc.), the configuration of the set of sheets, the contact state between the sheet materials (the presence or absence of an intervening layer, etc.), the desired joint strength, and the nugget size (referred to as a "nugget diameter" regardless of the shape).

An example of the main energization step will be described below for a case in which the first energization step and second energization step constituting the main energization step are performed on a set of sheets having a first steel sheet, a second steel sheet, and an aluminum alloy sheet that are stacked in order.

(1) First Energization Step

The first energization step is provided to generate a molten pool between the facing surfaces of the first steel sheet and the second steel sheet, for example, without melting the aluminum alloy sheet. The solidified portion becomes a (first) nugget. When the energization is performed with a DC current, its (first) current value is, for example, 4 to 10 kA in an embodiment, 6 to 9.5 kA in another embodiment, or 7 to 9.0 kA in still another embodiment. As a (first) current density of the first current, it is, for example, 10 to 200 $A/mm^2$ in an embodiment or 25 to 100 $A/mm^2$ in another embodiment.

When the current value varies, the average value obtained through dividing the integral value of the current value (absolute value) with respect to the energization time by the energization time is adopted as the "current value." The current density is obtained through dividing the current value by the tip area of an electrode. When the tip portion of an electrode having an approximately cylindrical shape or an approximately cylindrical solid shape is in a flat shape or a radius shape, for example, the tip area of the electrode is obtained as a circular area (area corresponding to a tip diameter: D1) projected from the tip portion. The tip area of an electrode can be substituted with the area of an indentation formed on the sheet material after spot welding (contact area between the sheet material and the electrode). The current density is calculated, for example, through dividing the current value by the tip area of the electrode (first electrode in the case of the first energization step) in contact with the sheet material located on the side close to the welded portion (joined portion). The same applies to the second energization step, which will be described later.

The pressing force in the first energization step is, for example, 2 to 6 kN in an embodiment or 3 to 5 kN in another embodiment. The energization time is, for example, 25 to 300 ms in an embodiment or 50 to 200 ms in another embodiment.

The molten pool or its solidified portion formed in the first energization step may have such a size that it serves as a heating source due to heat transfer for the Al alloy sheet in the second energization step. Even when the molten pool or its solidified portion is small at the end of the first energization step, it can grow in the second energization step to become a sufficient first nugget. In this regard, the (first) energization time of the first energization step may be shorter than the (second) energization time of the second energization step.

Before the first energization step, a pre-energization step may be performed in which the temperature of the set of sheets is raised so that the contact state between the sheet materials is settled. The pre-energization step may be preferably performed by energizing the set of sheets, with which the electrodes are in pressure contact, without generating a molten pool. For example, the pre-energization step is performed by energization with a pre-current value (time average value) smaller than the first current value. The pre-current value is, for example, 0.5 to 5 kA in an embodiment or 1 to 4 kA in another embodiment.

(2) Second Energization Step

The second energization step is provided to causes a melting reaction, for example, between the facing surfaces of the second steel sheet and the Al alloy sheet. The solidified portion or an intermetallic compound-generated portion becomes a (second) nugget. When the energization is performed with a DC current, the (second) current value is, for example, 11 to 15 kA in an embodiment, 11.5 to 14.5 kA in another embodiment, or 12 to 14 kA in still another embodiment. The current value is usually set larger than the first current value (e.g., larger by about 2 to 6 kA in an embodiment or larger by about 3 to 5 kA in another embodiment). The (second) current density is, for example, 50 to 300 $A/mm^2$ in an embodiment or 100 to 250 $A/mm^2$ in another embodiment.

During the second energization step, the aluminum alloy sheet may be preferably heated and melted by its own resistance heating and the heat transfer from the second steel sheet side. Thus, even the aluminum alloy sheet having a high conductivity can be melted by energization with a suppressed current value, and the occurrence of spatter or the like is suppressed also in the second energization step.

The pressing force in the second energization step is, for example, 2 to 6 kN in an embodiment or 3 to 5 kN in another embodiment. The energization time is, for example, 50 to 600 ms in an embodiment or 150 to 400 ms in another embodiment.

A cooling step of lowering the temperature of the set of sheets may be performed after the first energization step and prior to the second energization step. The cooling step is usually performed through the electrodes which are in pressure contact with the set of sheets. The cooling step may be performed by non-energization of cutting off the energization through the electrodes or may otherwise be performed by energization with a current value smaller than that in the first energization step. The electrical resistance value of the set of sheets is reduced by the cooling step, and the occurrence of spatter or the like is suppressed even when the energization is performed with a large current value.

Thus, the main energization step may include the first energization step of generating a molten pool between the first steel sheet and the second steel sheet and the second energization step of causing a melting reaction between the second steel sheet and the aluminum alloy sheet. In this case, the first steel sheet and the second steel sheet are joined via the first nugget, and the second steel sheet and the aluminum alloy sheet are joined via the second nugget.

(3) Others

The main energization step may include varying the current value (current density) and/or the pressing force during at least one energization step or between the energization steps. For example, at least a part of the main energization step may be provided with an upslope portion (region) in which the amount of energization is gradually increased (e.g., an increase rate: 5 to 40 A/ms). By gradually increasing the amount of energization from the start of energization, it is possible to suppress the occurrence of spatter or dust, etc. due to a sudden increase in the current value. Additionally or alternatively, at least a part of the main energization step may be provided with an downslope portion (region) in which the amount of energization is gradually reduced. By gradually reducing the amount of energization from before the end of energization, it is possible to suppress weld cracking (such as solidification cracking due to solidification contraction of the molten pool or hot cracking that can occur near the recrystallization temperature) due to a sudden drop in the current value.

The pressing force may also be varied in a step other than the pressing variation step. The upper limit of the pressing force may be preferably a level that does not cause excessive sheet thickness reduction, indentation, or the like. The lower limit of the pressing force may be preferably a level that stably ensures a pressure contact state between the sheet materials.

«Resin Material»

A resin material may be interposed (as an intervening layer) between at least a pair of sheet materials to be spot-welded. The resin material is, for example, an adhesive or a sealant or may otherwise be a coating film, an oil film, or the like. Examples of the "resin material" as referred to in the present specification include not only resins (mainly synthetic resins) but also rubbers (mainly synthetic rubbers) and elastomers. The resin may be a thermosetting resin or a thermoplastic resin. The mechanism of curing or solidification of a resin or a rubber is not limited.

When spot welding is performed with an adhesive interposed between sheet materials (weld bonding), a joined body is obtained in which both planar adhesion and spot welding are used. Such a joined body (weldment) is excellent not only in the joint strength but also in the rigidity, fatigue strength, and the like.

When spot welding is performed with a sealant interposed between sheet materials, the vicinity and surroundings of the welding point are sealed to suppress the infiltration of moisture and the like, thus preventing the corrosion of the weldment and other troubles. Corrosion includes galvanic corrosion (electrolytic corrosion) that occurs between different types of sheet materials having different natural potentials in addition to oxidation (such as rust) of each sheet material. The above-described adhesive may substantially serve as a sealant.

A resin material (such as an adhesive or a sealant) is usually applied to a sheet material (such as by coating) before spot welding. Even when a resin material is interposed between sites that can be spot-welded (referred to as "planned welding sites"), electrical conduction (energization) between the sheet materials is possible. Even when the resin material is non-conductive, the pressing variation step allows the resin material to be pushed out (discharged) from the planned welding sites, thus promoting the metal contact (metal touch) between the sheet materials. When a conductive resin material is used, electrical conduction (energization) between the sheet materials is possible regardless of the presence or absence of the pressing variation step. However, if a conductive resin material is interposed between sheet materials of dissimilar metals (e.g., a steel sheet and an Al alloy sheet), galvanic corrosion is likely to occur. In such a case, it may be preferred to use a non-conductive resin material.

The resin material may be in a solid state, but if there is a fluid (such as in a liquid state or a paste state), the workability of application to a sheet material, the discharge ability during the spot welding, etc. can be improved. The discharge of the resin material from the planned welding sites may be performed only by the pressing force or may also be performed by adding electrical heating.

The adhesive is selected in accordance with the spec of the weldment, the type of sheet materials, etc. Typical examples include structural adhesives such as epoxy-based, acrylic-based, polyurethane-based, and silicon-based structural adhesives. One-component adhesives are excellent in the workability, and thermosetting adhesives are excellent in the heat resistance. Heating required for curing may be performed separately, but residual heat during the welding or heating (such as drying or baking) in a post-step (such as coating) may be used (also for the heating for curing).

The sealant is also selected in accordance with the spec of the weldment, the type of sheet materials, etc. Typical examples include spot sealers such as silicone-based, modified silicone-based, urethane-based, polyurethane-based, and polysulfide-based spot sealers.

The resin material may contain various types of filling materials (fillers). Examples of the fillers include reinforcing materials that increase the joint strength and conductive materials (such as metal powder) that reduce the electrical resistance between the sheet materials. The conductivity of the resin material can be adjusted by a filler. Whether pretreatment (removal of oil film or oxide film, cleaning, etc.) of the surface of a sheet material to which the resin material is applied may be preferably selected in accordance with the type of the resin material.

«Heat Treatment Step»

The weldment may be subjected to heat treatment such as annealing or tempering as appropriate. Through the heat treatment, adjustment of the structure, removal of the residual stress, and the like are achieved in each joined portion (nugget) or its vicinity (heat-affected portion). The heating method may be, for example, heating in a furnace or energization heating. The heating range may be the joined set of sheets as a whole or a spot-welded local portion.

The heating temperature is, for example, 120° C. to 250° C. in an embodiment or 150° C. to 200° C. in another embodiment. The heating time is, for example, 5 to 180 minutes in an embodiment or 20 to 120 minutes in another embodiment. When a resin material is interposed between the sheet materials, the heating temperature and the heating time may be preferably within ranges in which the resin material does not deteriorate.

«Electrodes»

(1) Form

The electrodes for spot welding may each be an electrode that can be detachably attached to a shank (a cap tip-type electrode) or may otherwise be an electrode that is integrated with a shank (an integrated-type electrode). The cap tip-type electrode (also referred to as a "tip") is usually used in order to reduce the cost.

The electrode (tip) has, for example, a tip portion that is formed in a bottomed and approximately cylindrical shape and a body portion that is formed in an approximately cylindrical shape and merges into the tip portion. The size of the electrode is not limited. The outer diameter (nominal diameter/D2) of the body portion is, for example, φ10 to 20 mm in an embodiment or φ12 to 18 mm in another embodiment. The tip diameter (D1) is, for example, φ6 to 14 mm in an embodiment or φ8 to 12 mm in another embodiment. The tip portion of the electrode may be convex or concave. However, when a resin material is interposed between the sheet materials, the tip portion may be preferably convex and particularly preferably approximately spherical. This can improve the discharge ability of the resin material during the pressing variation step. The radius of curvature of such a tip portion is, for example, 10 to 100 mm in an embodiment or 40 to 70 mm in another embodiment.

The electrode may be preferably configured such that a cooling medium (cooling liquid/cooling water) is introduced into an inner cylindrical part provided inside the tip portion. When the cooling medium is forcibly circulated, suppression of temperature rise of the electrode and cooling of the sheet materials through the electrode are stably achieved.

Various basic shapes of the tip portions of electrodes (in particular, convex electrodes) are defined in JIS C9304 (1999). Examples of the basic shapes include a flat shape (F-type), a radius shape (R-type), a dome shape (D-type), a dome radius shape (DR-type), a cone frustum shape (CF-type), and a cone frustum radius shape (CR-type). From the viewpoint of versatility, for example, DR-type or R-type electrodes may be preferably used.

(2) Material

The electrodes (at least the tip portions) may be preferably made of a material excellent in the thermal conductivity, electrical conductivity, strength, etc. For example, a copper alloy having an electrical conductivity of 75% to 95% IACS in an embodiment or 80% to 90% IACS in another embodiment is used for the electrodes. The copper alloy is, for example, chromium copper, zirconium copper, chromium-zirconium copper, alumina-dispersed copper, beryllium copper, or the like. The electrodes constituting a pair may have the same form (shape, size (diameter)) and material or different forms and materials.

Examples

The present invention will be specifically described while exemplifying a case in which a set of sheets is joined, comprising two steel sheets and an Al alloy sheet that are stacked in order.

«Production of Samples»

FIG. 1 illustrates the overview of spot welding according to the present example. The materials to be welded are a set of sheets in which a first steel sheet, a second steel sheet, and an Al alloy sheet are stacked in order. An adhesive was applied between the second steel sheet and the Al alloy sheet. Spot welding (weld bonding) was performed by energizing the set of sheets while clamping both outer surfaces with a pair of electrodes.

(1) Sheet Materials

A non-plated cold-rolled steel sheet (440 MPa class/sheet thickness: 1.4 mm) was used as the first steel sheet while an alloyed hot-dip galvanized steel sheet (270 MPa class/sheet thickness: 0.75 mm) was used as the second steel sheet, with an Al alloy sheet (wrought material equivalent to JIS A6022/sheet thickness: 1.2 mm). The galvanized steel sheet is formed with galvanized layers (metal layers) having a thickness of about 8 μm. The melting point of the galvanized layer itself is about 420° C., and the melting point of the Al alloy sheet is about 650° C. An epoxy-based structural adhesive (Felco series available from Aisin Chemical Co., Ltd.) was used as the adhesive.

Each sheet material was subjected to the spot welding without any modification such as surface polishing. Each sheet material was cut into a strip shape (30 mmx 100 mm) and used. The adhesive was applied in the shape of a thin disc (φ16 mm×thickness 1 mm) to the vicinity of a planned welding site of the surface of the second steel sheet (on the Al alloy sheet side). A template of φ16 mm×thickness 1 mm was used for the application with a spatula so that the application amount would be constant. Before the application, pretreatment (such as degreasing) was not performed on the surface of the second steel sheet (adherend surface).

(2) Electrodes

The same DR-type (JIS C9304) commercially available tips (available from OBARA Corporation) were used for the first electrode on the first steel sheet side and the second electrode on the Al alloy sheet side. Forcibly circulated cooling water (flow rate: 2.7 L/min) was supplied into the inside (inner cylindrical parts) of the tips to forcibly cool the tips. The electrodes are made of chromium copper (Cr: 1 mass %, Cu: the balance) and the electrical conductivity is 80% IACS.

As illustrated in the enlarged diagram of FIG. 1, the sizes of the electrodes were set to a tip diameter (nominal diameter D2): φ16 mm, a tip bottom portion thickness of 12 mm, a tip shoulder portion radius of curvature (R): about 3 mm, and a tip surface radius of curvature (R1): 40 mm. The tip diameter (D1) was set to 12 mm.

(3) Welding Conditions

Figure 2:
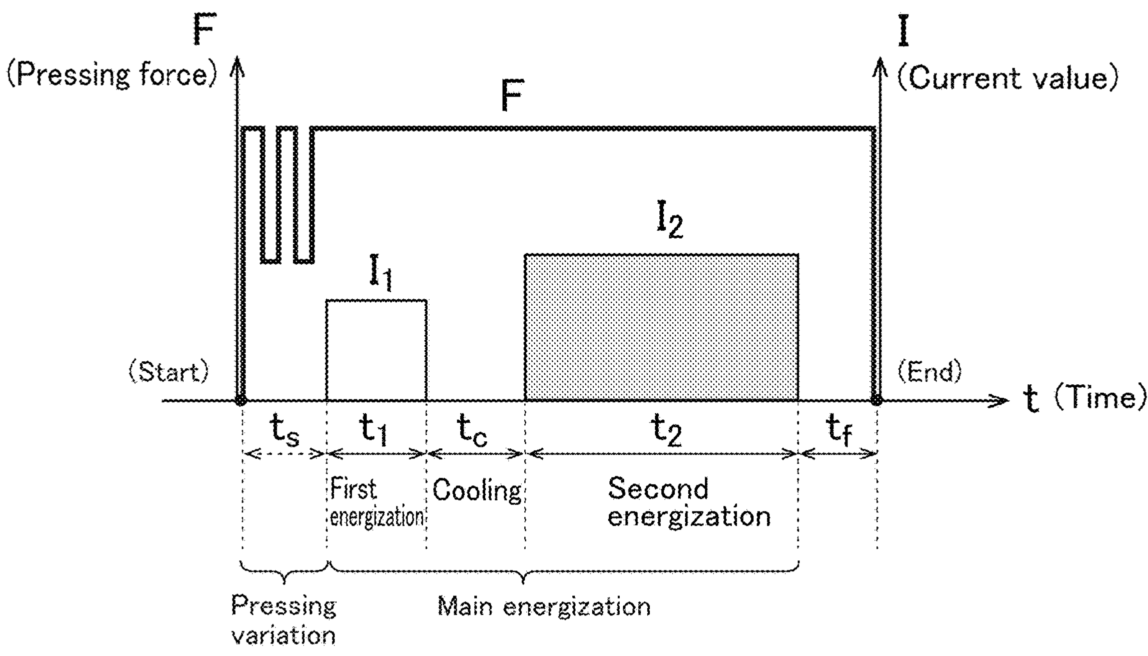
FIG. 2 is a time chart example for the spot welding.

Spot welding was performed along the energization pattern illustrated in FIG. 2 using a servo pressure-type spot welder (PA235KVAMF available from ARO) as follows.

The reference value of the pressing force (F) was set to 4 kN (constant), and the electrodes continued to pressurize the set of sheets from the start to the end of spot welding. However, until a predetermined time (ts) elapsed from the start, no energization was performed, and only the pressing force was increased and decreased (pulsated) in a pulse-like form (pressing variation step). Specific conditions were set with ts=500 ms, the period (pulse width): 60 ms, the amplitude (variation width): 2 kN (50% of the reference value), and the number of variations (number of pulses): 2.

The energization was performed by controlling the DC current for the first energization step and the second energization step (main energization step). The pressing variation step was followed by the first energization step, which was started after returning the pressing force to the reference value. The first energization step was designed with a first current value ($I_1$): 9 kA (constant) and an energization time: 200 ms. The second energization step was designed with a second current value ($I_2$): 13 kA (constant) and an energization time: 300 ms.

The cooling step was provided before the start of the second energization step. In the cooling step, a period of 100 ms after the completion of the first energization step was set to a non-energization state. This allows the set of sheets to be cooled through both the electrodes, and the electrical resistance value between the sheet materials (in particular, between the second steel sheet and the Al alloy sheet) is reduced into a predetermined range. According to this cooling step, the subsequent second energization step was stabilized.

Thus, Sample 1 was obtained in which the set of sheets was joined by spot welding together with the adhesive (weld bonding). For comparison, Sample C1 was also produced, which was spot-welded with a pressing force of 4 kN (constant) from the start to the end without performing the above-described pressing variation step. Furthermore, Sample C0 was also produced in which the set of sheets was spot-welded without performing the application of an adhesive and without the pressing variation step.

«Actually Measured Waveforms»

Figure 3A:
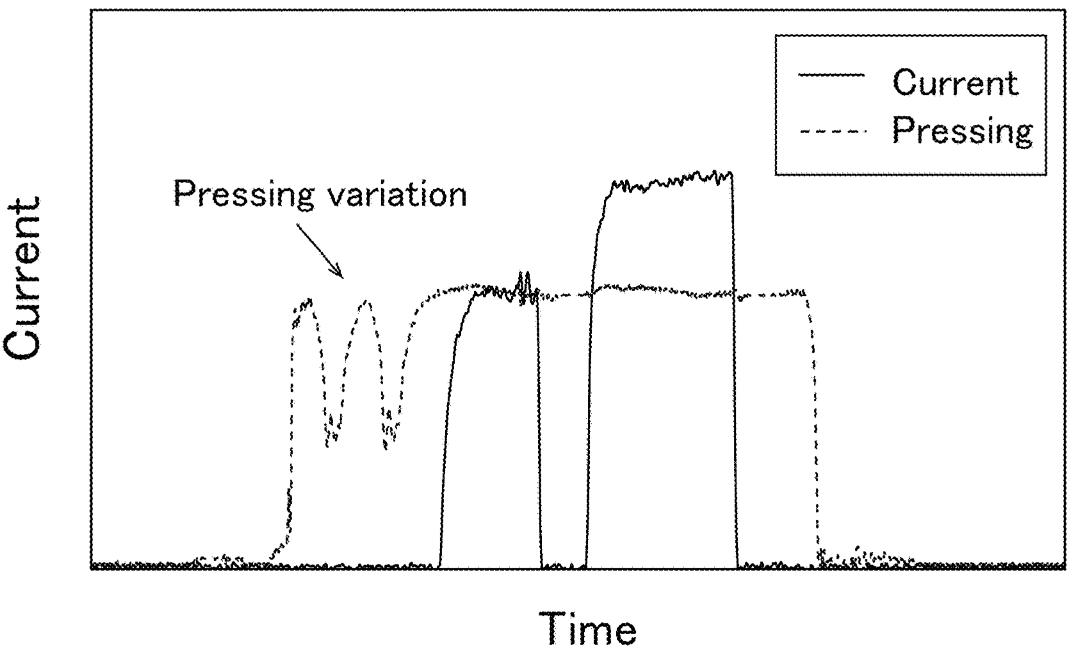
FIG. 3A illustrates the actually measured waveforms of pressing force and current value (Sample 1).
Figure 3B:
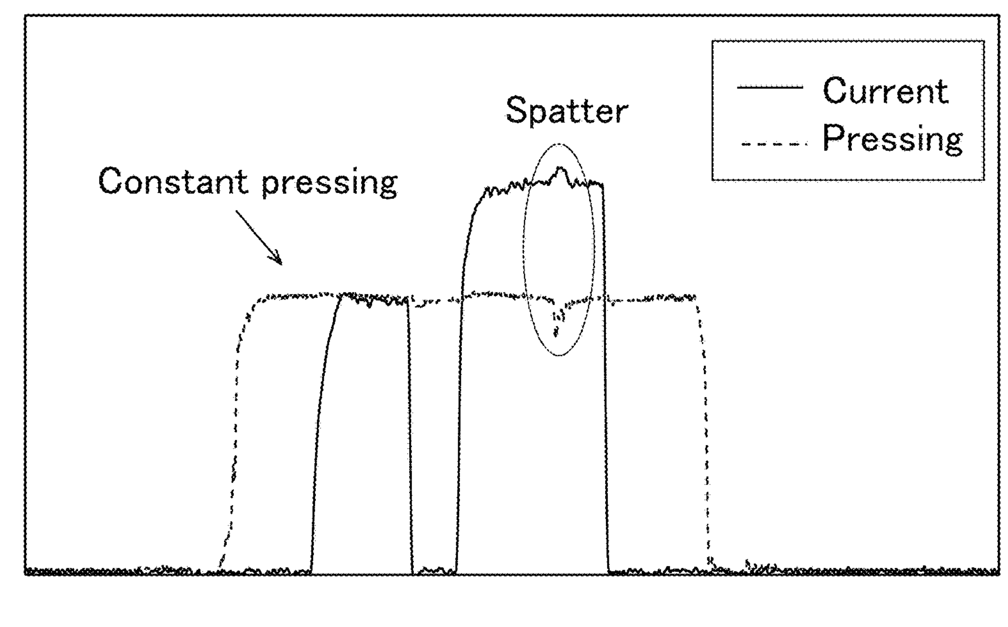
FIG. 3B illustrates the actually measured waveforms of pressing force and current value (Sample C1).

FIGS. 3A and 3B (both figures are collectively referred to as "FIG. 3") illustrate the actually measured waveforms of the pressing force and current value during the spot welding for Sample 1 and Sample C1.

«Joint Strength»

Each sample was subjected to a tensile shear test (in accordance with JIS Z6136) to measure the joint strength. The obtained strength was converted into a ratio to the tensile shear strength of Sample C0 and collectively illustrated in FIG. 4. All the samples were subjected to the tensile shear test without performing a thermal curing treatment after the spot welding. Just for information, when Samples 1 and C1 undergone a thermal curing treatment were subjected to the tensile shear test, both the samples broke at the Al alloy sheet portion rather than at the spot-welded portion.

«Observation»

Figure 5A:
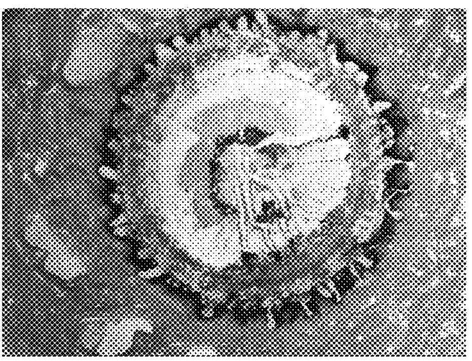
FIG. 5A is a set of photographs each showing a delaminated surface of a welded portion (Sample 1).
Figure 5A:
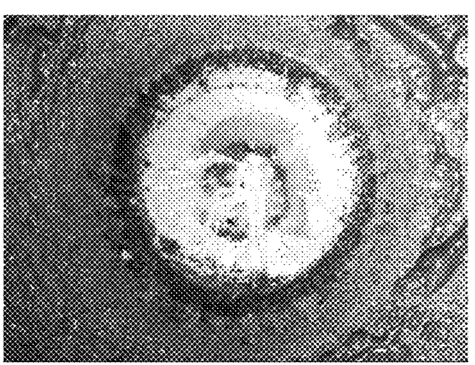
Figure 5B:
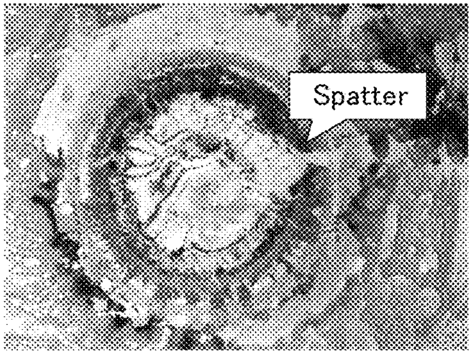
FIG. 5B is a set of photographs each showing a delaminated surface of a welded portion (Sample C1).
Figure 5B:
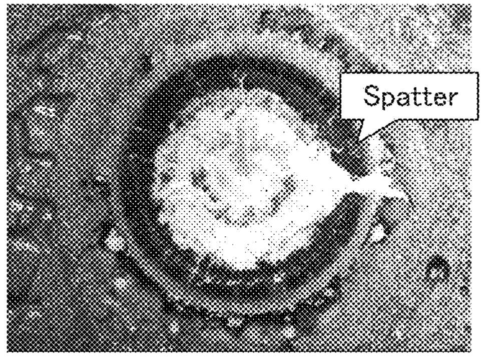

FIGS. 5A and 5B (both figures are collectively referred to as "FIG. 5") show the delaminated surfaces after the tensile shear test for Sample 1 and Sample C1, respectively. Both the samples were delaminated at the spot-welded portion between the Al alloy sheet and the second steel sheet.

«Evaluation»

Figure 4:
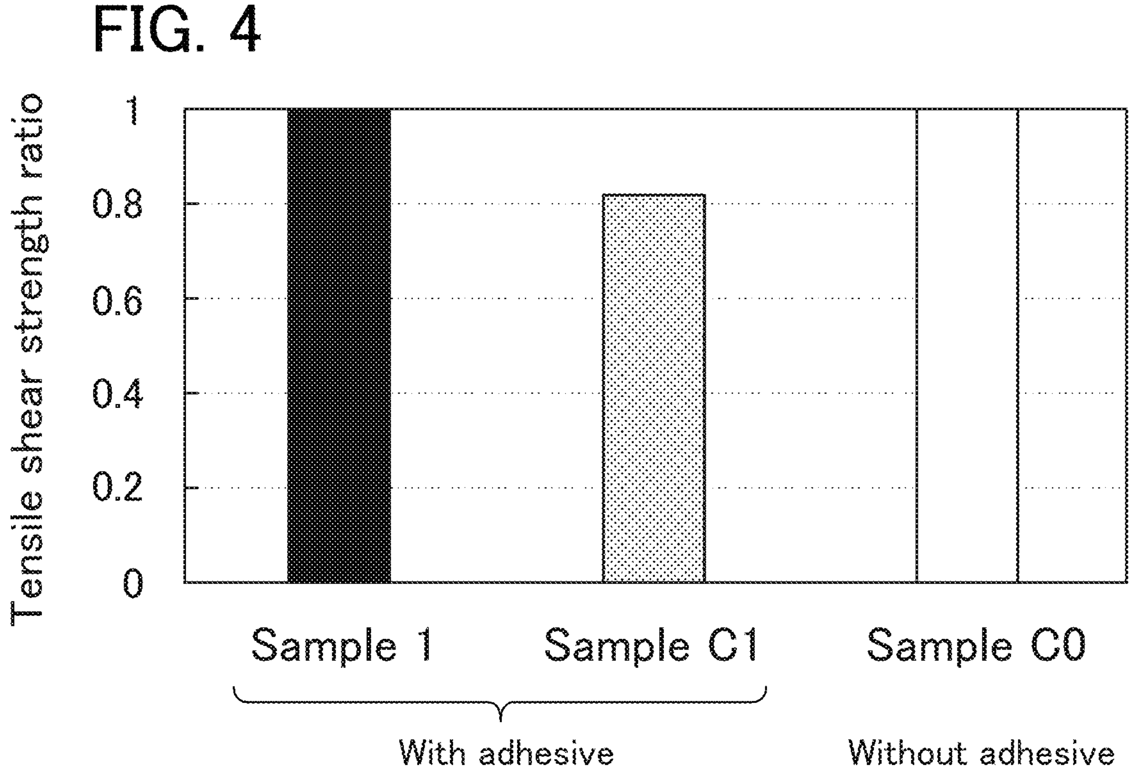
FIG. 4 is a bar graph comparing the joint strength of each sample.

As apparent from FIGS. 3, 4, and 5, it has been found that Sample 1 subjected to the pressing variation step is joined with high strength without causing spatter or the like. It has also been found that the joint strength of Sample 1 is comparable with that of Sample C0 which is spot-welded without interposing an adhesive between the Al alloy sheet and the second steel sheet.

On the other hand, in Sample C1 for which the pressing variation step was not performed, as apparent from the waveforms of the pressing force/current value illustrated in FIG. 3 and the situation of the delaminated surfaces shown in FIG. 4, spatter occurred to deteriorate the joint strength.

Sample 1 subjected to the thermal curing treatment after the spot welding exhibits an extremely high joint strength and rigidity because, as previously described, planar joint due to the adhesive is added to the spot welding.

As described above, it has been confirmed that when the pressing variation step is performed prior to the main energization step, a high-strength weldment can be stably obtained by spot welding even with an adhesive or the like interposed between the sheet materials.

«Consideration»

It is considered that the first nugget and the second nugget were formed as follows. First, the first nugget formed between the facing surfaces of the first steel sheet and the second steel sheet and the second nugget formed between the facing surfaces of the second steel sheet and the Al alloy sheet were observed with a metallurgical microscope. The first steel sheet and the second steel sheet were melted and solidified to generate the first nugget while the Al alloy sheet is mainly melted and solidified to generate the second nugget.

The structure near the joint interface (second nugget) between the second steel sheet and the Al alloy sheet was observed with an energy dispersive X-ray spectroscope (EDX). Plural types of intermetallic compounds, for example, $Fe_2Al_5$ phase, $FeAl_3$ phase, and Fe—Al—Zn phase (solid solution of Zn mainly in $Fe_2A_{15}$) or Al—Zn phase were observed. In particular, $Al_5Fe_2$ phase (or Fe—Al—Zn phase) was observed on the second steel sheet side, and $Al_3Fe$ phase was confirmed on the Al alloy sheet side.

Figure 6:
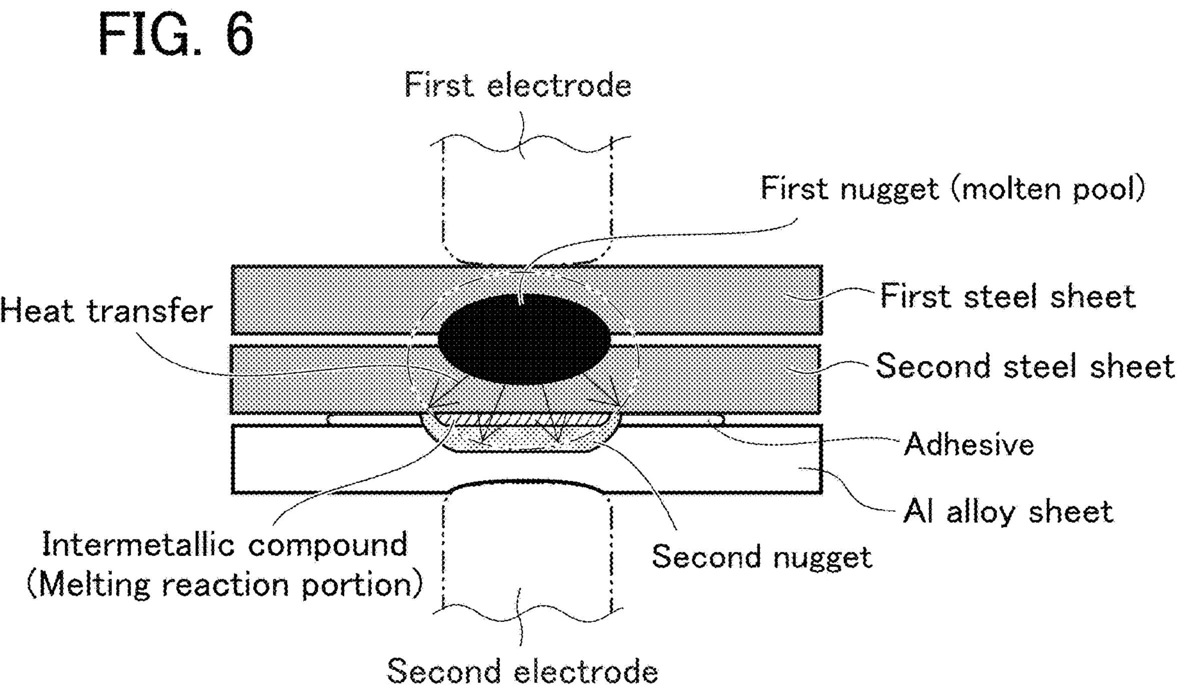
FIG. 6 is a schematic diagram illustrating the progress process of spot welding.

From these, it can be said that, as illustrated in FIG. 6, the second nugget is formed such that the Al alloy melted also by the heat transfer from the vicinity of the first nugget reacts with the second steel sheet to generate an intermetallic compound.

The invention claimed is:

1. A spot welding method comprising:

energizing a pair of opposing electrodes in pressure contact with both outer surfaces of a set of sheets comprising two or more sheet materials which are stacked, thereby to cause melting between facing surfaces of the two or more sheet materials; and pulsating a pressing force applied to the set of sheets from the pair of opposing electrodes only prior to energizing the pair of opposing electrodes, wherein each electrode in the pair of electrodes is in contact with a different outer surface of the set of sheets simultaneously.

2. The spot welding method according to claim 1, wherein the pulsation has a period of 0.01 to 0.7 seconds.

3. The spot welding method according to claim 1, wherein the pulsation has an amplitude that is 10% to 90% with respect to a reference value of the pressing force.

4. The spot welding method according to claim 1, wherein a resin material is interposed between the facing surfaces of the two or more sheet materials.

5. The spot welding method according to claim 4, wherein the resin material is an adhesive or a sealant.

6. The spot welding method according to claim 1, wherein each of the electrodes has a radius of curvature of 10 to 100 mm at a tip portion to be in contact with one of the sheet materials.

7. The spot welding method according to claim 1, wherein the set of sheets comprises at least a first steel sheet, a second steel sheet, and an aluminum alloy sheet that are stacked in order.

8. The spot welding method according to claim 7, wherein the main energization step comprises:

generating a molten pool between the facing surfaces of the first steel sheet and the second steel sheet without melting the aluminum alloy sheet; and causing a melting reaction between the facing surfaces of the second steel sheet and the aluminum alloy sheet after generating the molten pool between the facing surfaces, the first steel sheet and the second steel sheet are joined via a first nugget, and the second steel sheet and the aluminum alloy sheet are joined via a second nugget that contains an intermetallic compound generated by the melting reaction, wherein the first and the second nugget are formed from the molten pool.

9. The spot welding method according to claim 8, further comprising cooling after the generating of the molten pool and prior to the causing of the melting reaction, lowering a temperature of the set of sheets in contact with the electrodes through no energization or energization with a current value smaller than that during the generating of the molten pool.

10. The spot welding method according to claim 1, wherein the main energization step includes an upslope portion in which an amount of energization is gradually increased.

* * * * *